(12) United States Patent
Hodgson

(10) Patent No.: US 10,296,801 B2
(45) Date of Patent: May 21, 2019

(54) SYSTEMS AND METHODS FOR PROVIDING A CONTINUOUS CHECK SCANNER UTILIZING A TABLET COMPUTER AND CAMERA

(71) Applicant: NOWaccount Network Corporation, Atlanta, GA (US)

(72) Inventor: Lara O'Connor Hodgson, Atlanta, GA (US)

(73) Assignee: NOWaccount Network Corporation, Atlanta, GA (US)

( * ) Notice: Subject to any disclaimer, the term of this patent is extended or adjusted under 35 U.S.C. 154(b) by 200 days.

(21) Appl. No.: 15/224,575

(22) Filed: Jul. 31, 2016

(65) Prior Publication Data

US 2017/0053180 A1 Feb. 23, 2017

Related U.S. Application Data

(60) Provisional application No. 62/199,677, filed on Jul. 31, 2015.

(51) Int. Cl.
*G06F 1/16* (2006.01)
*G06K 9/20* (2006.01)
*G06K 9/22* (2006.01)

(52) U.S. Cl.
CPC ......... *G06K 9/2054* (2013.01); *G06F 1/1626* (2013.01); *G06F 1/1632* (2013.01); *G06F 1/1686* (2013.01); *G06K 9/209* (2013.01); *G06K 9/228* (2013.01)

(58) Field of Classification Search
None
See application file for complete search history.

(56) References Cited

U.S. PATENT DOCUMENTS

| | | | | |
|---|---|---|---|---|
| 2010/0328420 A1* | 12/2010 | Roman | ............... | H04N 5/2251 348/14.08 |
| 2011/0043702 A1* | 2/2011 | Hawkins | ................ | G06F 3/011 348/584 |
| 2011/0081946 A1* | 4/2011 | Singh | ................. | H04M 1/0264 455/556.1 |
| 2012/0077476 A1* | 3/2012 | Paraskevakos | .... | G07D 11/0066 455/414.2 |
| 2013/0124414 A1* | 5/2013 | Roach | ................... | G06Q 20/10 705/44 |

(Continued)

*Primary Examiner* — Bernard Krasnic
(74) *Attorney, Agent, or Firm* — Eversheds Sutherland (US) LLP

(57) ABSTRACT

Embodiments of the disclosure can provide systems and methods for providing a continuous check scanner utilizing a tablet computer and camera. In one embodiment, a system can be provided. The system can include a mirror device configured to mount with respect to an upper display screen of a tablet computer, wherein the mirror device is further configured to project image information to a camera associated with the tablet computer. The system can also include a holder configured to position the tablet computer with respect to a base surface, wherein a portion of the holder is configured to permit sound to be transmitted to an associated speaker and microphone of the tablet computer when the computer is mounted to the holder. In certain embodiments, the system can include an application program executing on the tablet computer when the tablet computer is mounted to the holder.

7 Claims, 6 Drawing Sheets

(56) References Cited

U.S. PATENT DOCUMENTS

| | | | | |
|---|---|---|---|---|
| 2013/0127309 A1* | 5/2013 | Wyner | ............... | H05K 5/0217 |
| | | | | 312/223.1 |
| 2015/0062416 A1* | 3/2015 | Vance | ................. | G03B 17/17 |
| | | | | 348/369 |
| 2015/0338934 A1* | 11/2015 | Hawkins | ............ | G06F 3/03545 |
| | | | | 345/157 |
| 2015/0356336 A1* | 12/2015 | Hoobler | ............... | G06K 7/089 |
| | | | | 235/455 |
| 2016/0012269 A1* | 1/2016 | Kowalczyk | ........ | G06K 7/10831 |
| | | | | 235/462.21 |
| 2016/0205357 A1* | 7/2016 | Pepito | ................. | H04N 7/185 |
| | | | | 348/148 |

\* cited by examiner

SYSTEMS AND METHODS FOR PROVIDING A CONTINUOUS CHECK SCANNER UTILIZING A TABLET COMPUTER AND CAMERA

RELATED APPLICATION

The present application claims priority to U.S. Ser. No. 62/199,677, filed Jul. 31, 2015, titled "Systems and Methods for Providing a Continuous Check Scanner Utilizing a Tablet Computer and Camera," the content of which is incorporated by reference.

TECHNICAL FIELD

The disclosure generally relates to payment systems, and, in particular, relates to systems and methods for providing a continuous check scanner utilizing a tablet computer and camera.

BACKGROUND

Conventional remote check scanning has previously taken three forms: (1) dedicated check scanners provided by financial institutions, each of which cost hundreds of dollars, (2) desktop scanners that can scan a check as well as other documents, and (3) photographing a check with a cell phone or tablet and transmitting that image. In each case, the scanned image can be transmitted to a financial institution for processing. Each of the previous conventional systems and methods suffers from significant drawbacks. With previous form (1), the hardware is expensive. With previous form (2), the process is slow and not intuitive. With previous form (3), the process is very slow, with one check at a time being photographed.

BRIEF DESCRIPTION OF THE DISCLOSURE

Embodiments of the disclosure can provide systems and methods for providing a continuous check scanner utilizing a tablet computer and camera. Certain embodiments of the disclosure can provide for the remote entry and verification of checks with relatively low cost and/or pre-existing hardware. Certain embodiments of the disclosure can allow relatively faster imaging of checks in a very intuitive fashion with relatively low cost or pre-existing hardware. Certain embodiments of the disclosure can permit faster processing and operation by a computer, such as a tablet computer, through facilitating and enhancing the capture and receipt of object and/or instrument information, and prompting and receiving relevant user inputs. Further, certain embodiments of the disclosure can permit faster processing and operation by a remotely located client computer, such as a computer associated with a processing center, bank, or financial institution, through facilitating and enhancing the capture and receipt of object and/or instrument information for subsequent processing, and prompting and receiving relevant user inputs.

In one embodiment, a system can be provided. The system can include a mirror device configured to mount with respect to an upper display screen of a tablet computer, wherein the mirror device is further configured to project image information to a camera associated with the tablet computer. The system can also include a holder configured to position the tablet computer with respect to a base surface, wherein a portion of the holder is configured to permit sound to be transmitted to an associated speaker and microphone of the tablet computer when the computer is mounted to the holder.

In certain embodiments, the mirror device can include a housing configured to mount to an edge of the upper display screen, and wherein the housing is further configured to position a mirror to project the image information received from an instrument positioned adjacent to the tablet computer towards the camera.

In certain embodiments, the holder can include a cavity operable to insert a portion of the tablet computer.

In certain embodiments, the holder can include one or more perforations operable to permit sound to pass through a wall of the holder to the associated speaker and microphone of the tablet computer.

In certain embodiments, the system can include an application program executing on the tablet computer when the tablet computer is mounted to the holder. The application program can include computer-executable instructions configured to identify information from an instrument positioned adjacent to the tablet computer; output the information on the display screen of the tablet computer; and encode some or all of the information for transmission to a remote location.

In certain embodiments, the computer-executable instructions can be further configured to detect placement of an instrument positioned adjacent to the tablet computer; output an image of the instrument on the display screen of the tablet computer; and direct orientation of the instrument with respect to the tablet computer.

In certain embodiments, the information can include an account number and a bank routing number.

In one embodiment, a non-transitory computer-readable medium can be provided. The non-transitory computer-readable medium can include computer-executable instructions configured to be executed by a computer processor. The computer-executable instructions can be further configured to activate a camera associated with a tablet computer, instruct a user to place an instrument in a target area adjacent to the tablet computer, receive one or more images of the instrument when placed in the target area, wherein the one or more images are projected from a mirror device to the camera, output the one or more images on a display screen associated with the tablet computer, process the one or more images to determine the instrument resembles a check, identify information from the instrument, the information comprising an encoded account number and bank routing number; output some or all of the identified information on the display screen of the tablet computer; and encode some or all of the identified information and at least one of the one or more images for transmission to a remote location.

In one embodiment, a method can be provided. The method can include providing a holder device operable to receive a tablet computer and further operable to position the tablet computer relative to a base surface; mounting a tablet computer to the holder device; mounting a mirror device with respect to an upper display screen of the tablet computer; operating a camera associated with the tablet computer in a video mode; outputting, to the display screen of the tablet computer, images projected from the mirror device to the camera; instructing a user to place an instrument in a target area adjacent to the tablet computer; processing one or more images from the camera to determine when the instrument resembles a check; when a determination is made that the instrument resembles a check, identifying information from the instrument, the information comprising an encoded account number and a bank routing number; outputting some or all of the identified information on the display screen of the tablet computer; and encoding some or all of the identified information and an image of the instrument for transmission to a processing center and/or financial institution.

In certain embodiments, the method can include identifying a currency amount from the instrument.

Other embodiments, features, and aspects of the disclosure will become apparent from the following description taken in conjunction with the following drawings.

DETAILED DESCRIPTION

The disclosure now will be described more fully hereinafter with reference to the accompanying drawings, in which example embodiments of the disclosure are shown. This disclosure may, however, be embodied in many different forms and should not be construed as limited to the example embodiments set forth herein; rather, these example embodiments, which are also referred to herein as "examples," are described in enough detail to enable those skilled in the art to practice the present subject matter. The example embodiments may be combined, other embodiments may be utilized, or structural, logical, and electrical changes may be made, without departing from the scope of the claimed subject matter. Like numbers refer to like elements throughout.

Embodiments of the disclosure can provide systems and methods for providing a continuous check scanner utilizing a tablet computer and camera. Certain embodiments of the disclosure can provide for the remote entry and verification of checks with relatively low cost and/or pre-existing hardware. Certain embodiments of the disclosure can allow much faster imaging of checks in a very intuitive fashion with relatively low cost or pre-existing hardware.

Figure 1B:
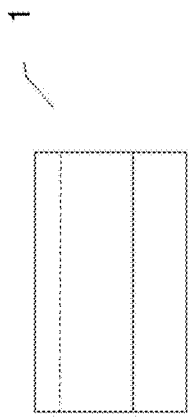
FIGS. 1A and 1B are respective side views and front views of an example system in accordance with an embodiment of the disclosure.
Figure 1A:
Figure 2B:
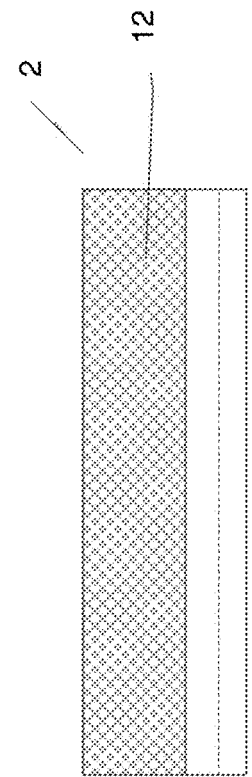
FIGS. 2A and 2B are respective side views and front views of the example system shown in FIGS. 1A and 1B with a tablet computer, in accordance with an embodiment of the disclosure.
Figure 2A:
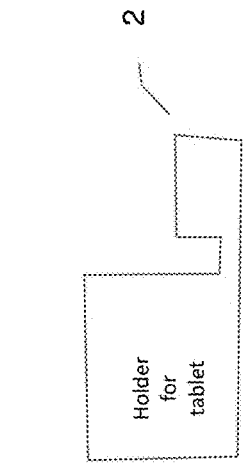
Figure 3B:
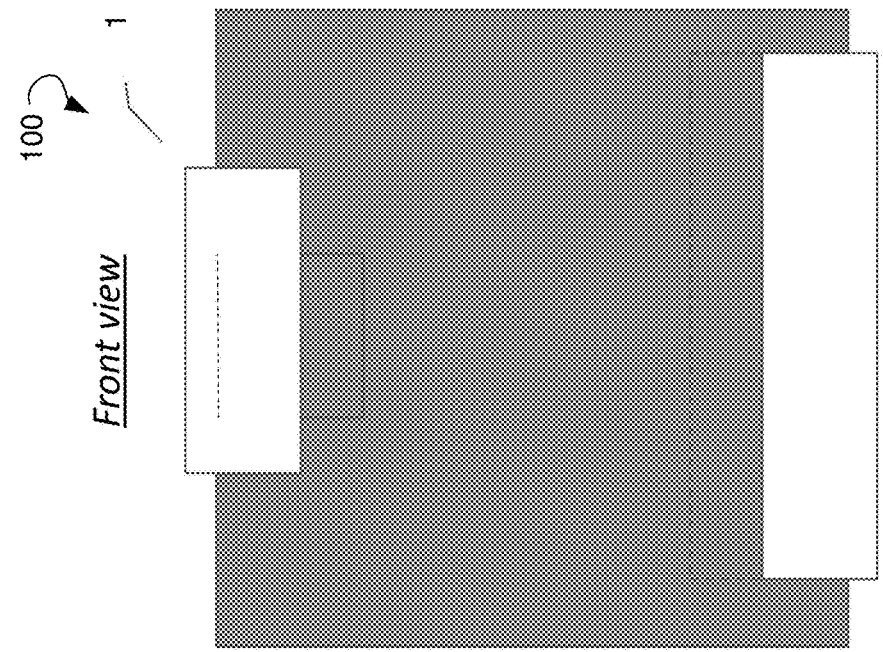
FIGS. 3A and 3B illustrate the side and front views of an example implementation of the example system shown in FIGS. 1A, 1B, 2A, and 2B with a tablet computer, in accordance with an embodiment of the disclosure.
Figure 3A:
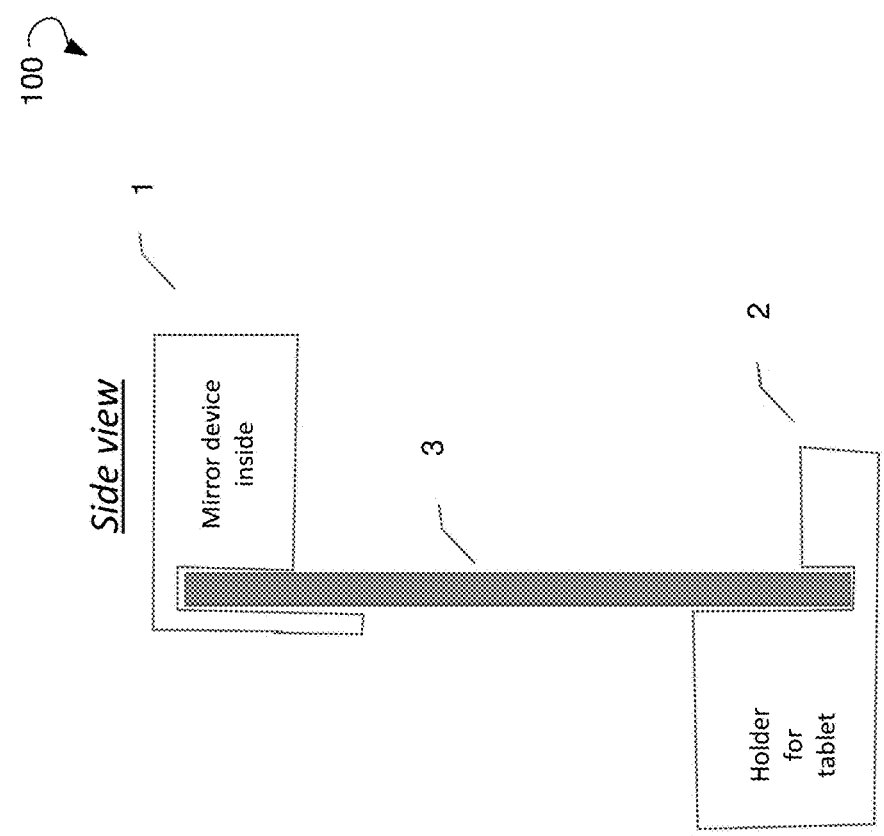
Figure 4:
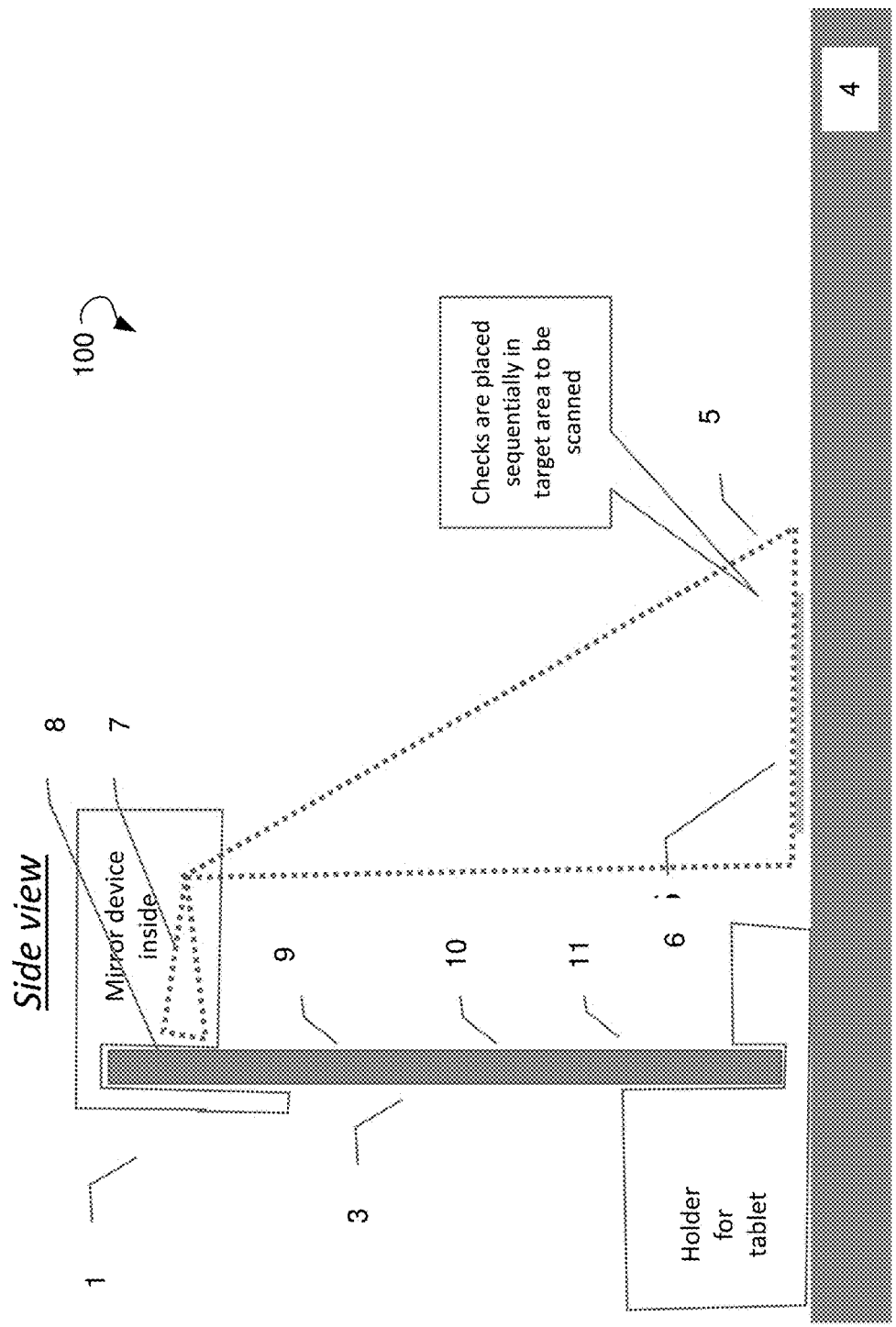
FIG. 4 illustrates an example implementation of the example system shown in FIGS. 1A, 1B, 2A, and 2B with a tablet computer, in accordance with an embodiment of the disclosure.

FIGS. 1A, 1B, 2A, and 2B illustrate an example system in accordance with an embodiment of the disclosure, and FIGS. 3A, 3B, and 4 illustrate an example implementation of the system shown in FIGS. 1A, 1B, 2A, and 2B. As shown in FIGS. 1A, 1B, 2A, and 2B, the system 100 can include a mirror device 1 and a holder 2. The mirror device 1 can be configured to be mounted to or otherwise fit to an upper edge of a tablet computer 3, such as shown in FIGS. 3A and 3B, for example, an iPad® device from Apple or a Nexus® device from Google, when the tablet computer 3 is positioned with respect to a surface 4, such as a table, as shown in FIG. 4. In the embodiment shown in FIG. 4, the mirror device 1 can be configured to reflect an image 5 of an object 6, such as an instrument, placed on or otherwise lying on the surface 4, such as a table. For example, the mirror device 1 can include at least one projection mirror 7 that can reflect an image 5 of an object 6, such as an instrument, placed on or otherwise lying on a surface, such as a table 4. The object 6, as shown in FIG. 4, can typically be positioned in front of and below or otherwise adjacent the tablet computer 3, wherein an image 5 of the object 6 can be reflected or otherwise projected by at least one projection mirror 7 of the mirror device 1 towards a camera 8 associated with the tablet computer 3.

Figure 5:
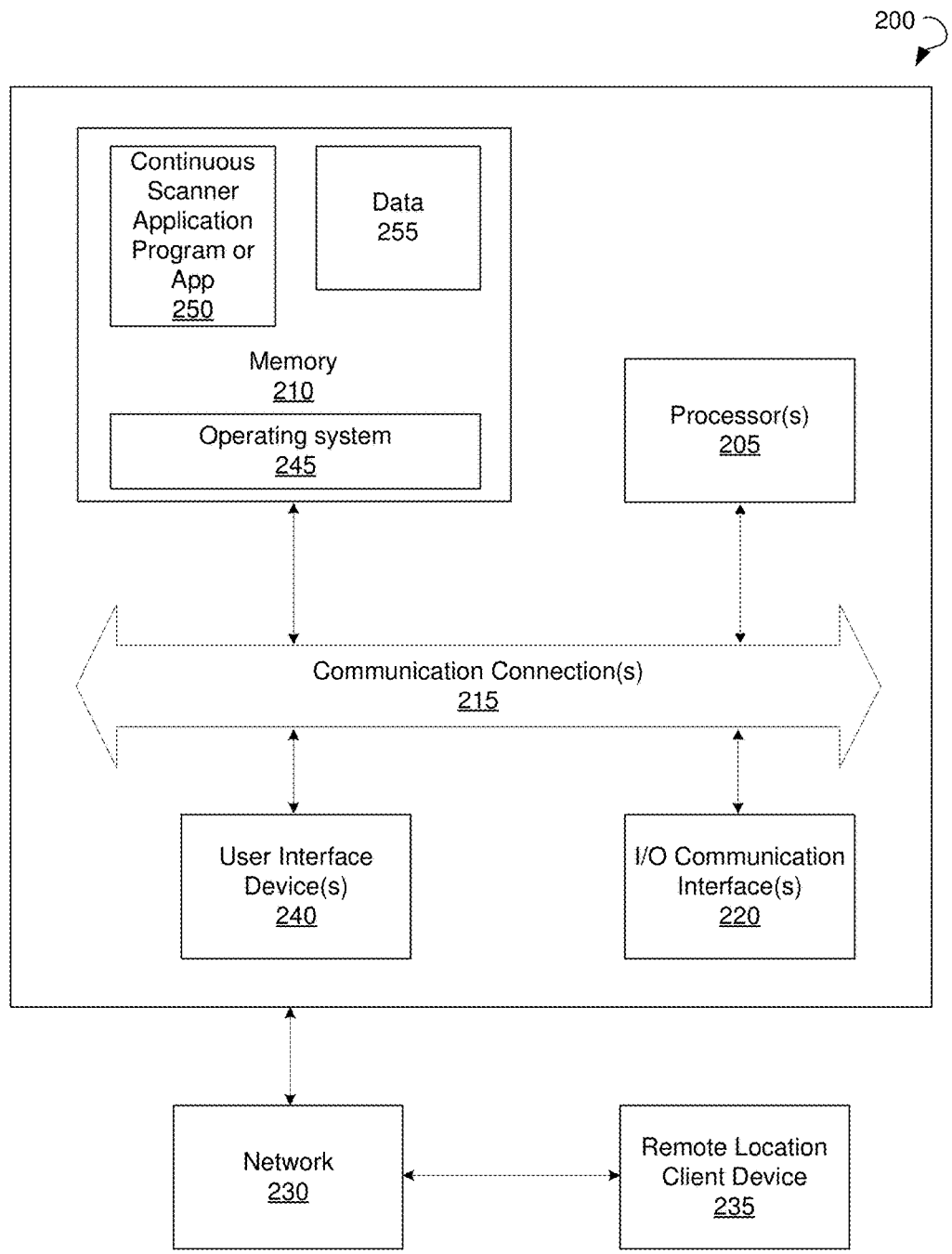
FIG. 5 illustrates an example tablet computer architecture to execute an application program or app, in accordance with an embodiment of the disclosure.

The system 100 can also include an application program or app, shown and described with respect to FIG. 5, stored in a memory device associated with the tablet computer 3. The tablet computer 3, when in operation, can execute, via at least one computer processor, an application program or app stored in a memory device associated with the tablet computer 3. The application program or app can be configured to provide a graphical user interface (GUI) 9 via a display screen 10 associated with the tablet computer 3. The GUI 9 may include one or more instructions 11 to a user operating the tablet computer 3 to position or otherwise locate the object 6 with respect to the mirror device 1 and/or surface 4 to facilitate providing a suitable reflection or image 5 of the object 6 to the camera 8 via the mirror device 1.

In certain embodiments, a mirror device, such as mirror device 1, can include any number of projection mirrors or reflection-type devices, similar to projection mirror 7, configured to reflect an image of an object towards a camera of a tablet computer.

In certain embodiments, a mirror device can include an elongated arm, such as arm 12 in FIG. 2B, which can be configured to provide a space between the arm 12 and an opposing surface of the mirror device. The mirror device, such as mirror device 1, can be mounted to an upper portion or edge of a tablet computer, such as tablet computer 3, wherein the portion or edge of the tablet computer 3 is between a portion of the arm 3 and at least one surface of the mirror device 1.

In certain embodiments, a mirror device, such as mirror device 1, can direct, reflect, or otherwise project an image received by the mirror device 1 towards a camera associated with the tablet computer. Adjustments in the length of the elongated arm, such as arm 12, the depth and/or size of the space between the arm 12 and an opposing surface of the mirror device 1, and position and/or angle of the mirror device 1 including any number of projection mirrors or reflection-type devices associated with the mirror device 1, can be made to accommodate different sizes of a computer, such as a tablet computer 3, and to facilitate providing a suitable reflection or image 5 of the object 6 to the camera 8 of the computer, via the mirror device 1.

The holder 2 can be operable to hold the tablet computer 3 in a relatively vertical or otherwise upright portion at an angle relative to the surface 4 or table. The holder 2 can include a cavity between two surfaces associated with the holder 2, such as shown in FIG. 3, wherein a lower portion or edge of the tablet computer 3 can be mounted within the cavity.

In certain embodiments, a front portion of the holder 2 can include one or more perforations 12 to permit sound waves to pass through a portion of the holder 2 to a speaker and/or microphone associated with and located in a lower portion of the tablet computer 2 when the tablet computer is inserted into the holder 2.

In certain embodiments, the size of the holder 2 and cavity between two surfaces associated with the holder 2 can be adjusted to accommodate different sizes of a computer, such as a tablet computer 3, and to hold the tablet computer 3 at a suitable angle for the mirror device 1 to obtain a suitable reflection or image 5 of the object 6.

FIG. 5 illustrates an example computer architecture to execute an application program or app, in accordance with an embodiment of the disclosure. The example computer 200 shown in FIG. 5 can be configured for implementing systems and methods for providing a continuous check scanner utilizing a tablet computer and camera in accordance with certain embodiments of the disclosure. For example, the example computer 200 can be used in conjunction with the system 100 described in FIGS. 1A, 1B, 2A, 2B, 3A, 3B, and 4. Further, by way of example, the example computer 200 can be used to execute or implement the methods described below in FIGS. 6 and 7. Generally, an application program or app, in accordance with certain embodiments of the disclosure, can include one or more computer-executable or machine-executable instructions written in any suitable programming language to perform certain methods, such as the method 300 described in FIG. 6, the method 400 described in FIG. 7, and others described herein.

In any instance, the computer 200 can include one more processors, such as processor 205, for executing certain operational aspects associated with implementing certain systems and methods for providing a continuous check scanner utilizing a tablet computer and camera in accordance with certain embodiments of the disclosure. The processor 205 can be capable of communicating with a memory 210. The processor 205 can be implemented and operated using appropriate hardware, software, firmware, or combinations thereof. Software or firmware implementations can include computer-executable or machine-executable instructions written in any suitable programming language to perform the various functions described. In one embodiment, instructions can be stored in the memory 210 and executed by the processor 205.

The memory 210 can be used to store program instructions that are loadable and executable by the processor 205, as well as to store data generated during the execution of these programs. Depending on the configuration and type of the computer system, the memory 210 can be volatile (such as random access memory (RAM)) and/or non-volatile (such as read-only memory (ROM), flash memory, etc.). In some embodiments, the memory devices can also include additional removable storage and/or non-removable storage including, but not limited to, magnetic storage, optical disks, and/or tape storage. The disk drives and their associated computer-readable media can provide non-volatile storage of computer-readable instructions, data structures, program modules, and other data for the devices. In some implementations, the memory 210 can include multiple different types of memory, such as static random access memory (SRAM), dynamic random access memory (DRAM), or ROM.

The memory 210, the removable storage, and the non-removable storage are all examples of computer-readable storage media. For example, computer-readable storage media can include volatile and non-volatile, removable and non-removable media implemented in any method or technology for storage of information such as computer-readable instructions, data structures, program modules or other data. Additional types of computer storage media that can be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tapes, magnetic disk storage or other magnetic storage devices, or any other medium which can be used to store the desired information and which can be accessed by the devices. Combinations of any of the above should also be included within the scope of computer-readable media.

The computer 200 can also include one or more communication connections 215 that can allow the processor 205 to communicate with devices or equipment capable of communicating with the computer 200. The communication connection(s) 215 can interface with an input/output (I/O) communication interface 220. I/O communication connections can also be established via various data communication channels or ports, such as USB or COM ports to receive cables facilitating communications to and from the processor 200 to various other devices on a network, such as a remote location client device 235 via a network 230. According to various embodiments, communication connections 215 can be established via a wired and/or wireless connection, and communications can be transmitted between a remote location client device 235, such as a processing center, financial institution or bank, via the network 230.

The computer 200 can also include one or more user interface devices 240, such as a touch display screen, microphone, keyboard, keypad, virtual keyboard or keypad, mouse, pen, voice input device, gesture input device, touch input device, a display screen, printer, and/or speakers. User inputs received from one or more user interface devices 240 can be received by the processor 205 via the communication connections 215, and processed and/or stored during execution of the application program or app.

Turning to the contents of the memory 210, the memory 210 can include, but is not limited to, an operating system (OS) 245 and one or more application programs or apps for implementing the embodiments, features, aspects, and functionalities described herein. Such applications or apps can include a continuous scanning application program or app 250 for executing certain systems and methods for providing a continuous check scanner utilizing a tablet computer and camera. In one embodiment, the continuous scanning application program or app 250 can include one or more scanning algorithms, which can be implemented by software that is provided in configurable control block language and is stored in non-volatile memory. When executed by the processor 205, the continuous scanning application program or app 250 and associated scanning algorithms can implement the various embodiments, features, aspects, and functionalities associated with the computer 200 described in this disclosure.

User inputs received from the user interface devices 240 can be stored by the processor 205 in memory 210 within a data storage device 255. Other data received by and/or otherwise collected by the computer 200 can be stored in the data storage device 255. In certain instances, the processor 205 and/or computer 200 may access remotely stored data via the network 230, such as in one or more data storage devices associated with a remote location client device 235. For example, data stored by a processing center, financial institution, bank, or data/cloud hosting service provider could be accessed by the processor 205 via the network 230.

Figure 6:
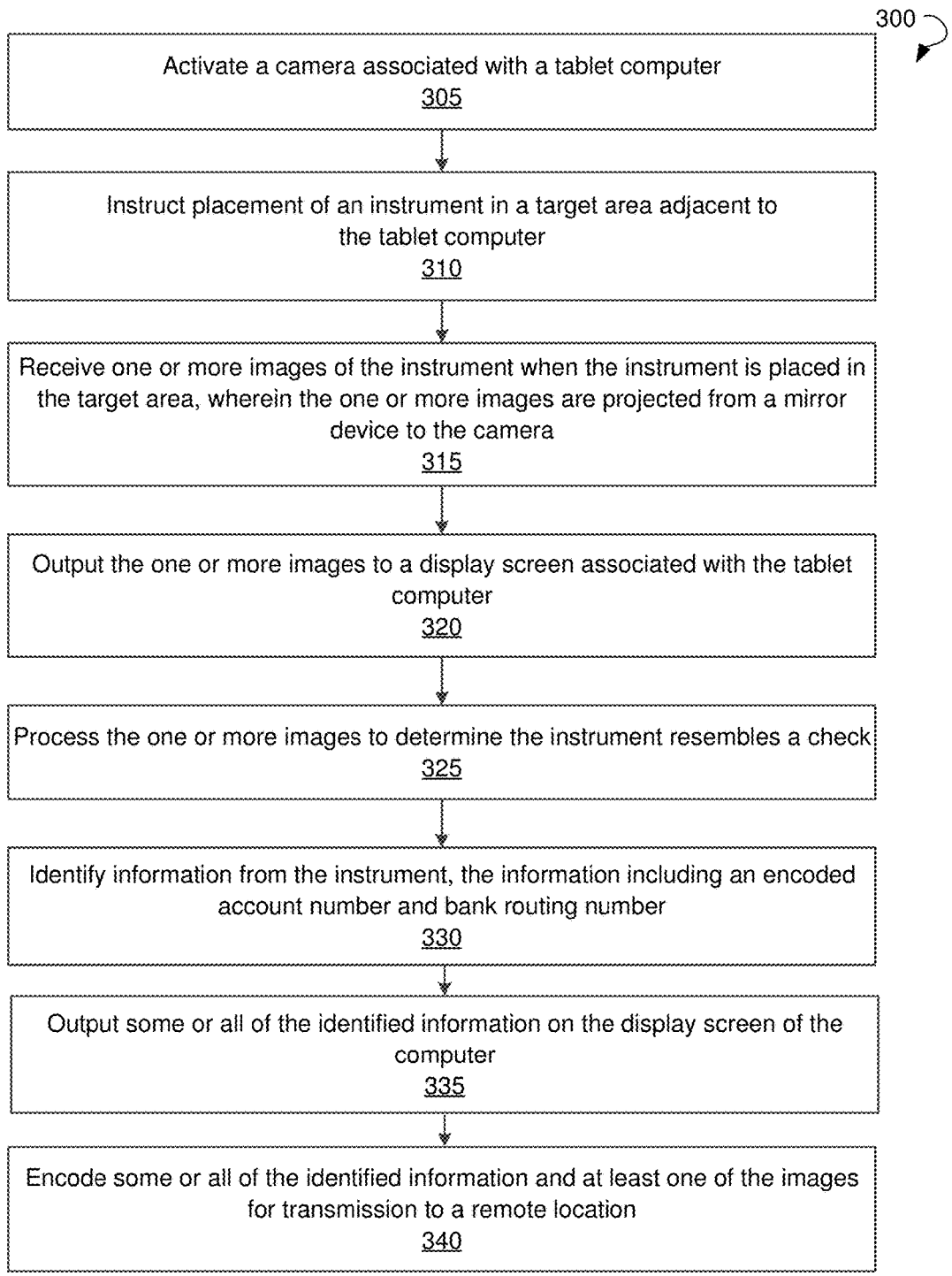
FIGS. 6 and 7 illustrate example methods in accordance with embodiments of the disclosure.
Figure 7:
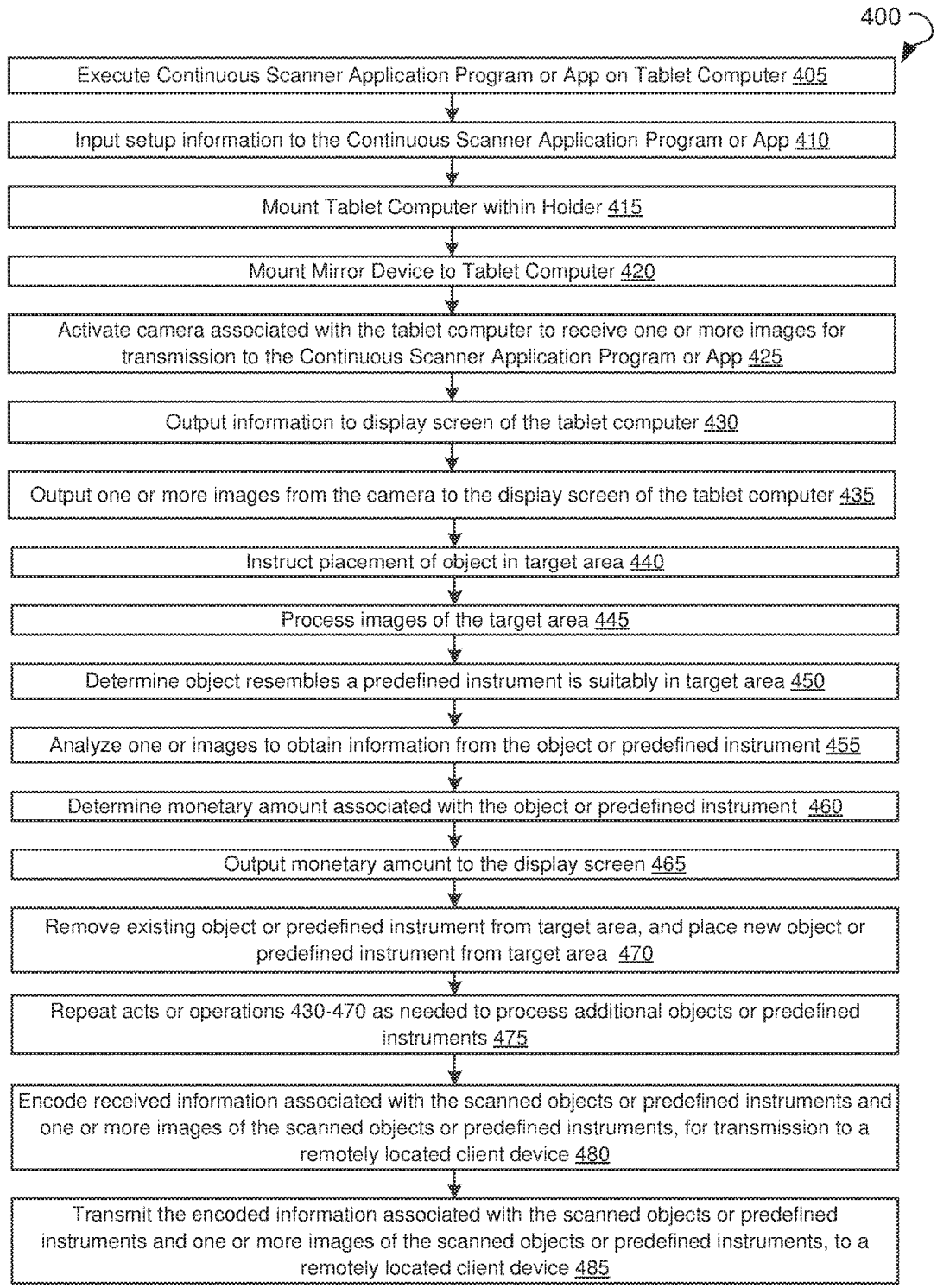

Turning to methodologies associated with the disclosure, FIGS. 6 and 7 illustrate certain methods associated with embodiments of the disclosure. The method 300 in FIG. 6 can be implemented, for example, by a computer, such as a tablet computer, or the computer described in FIG. 5 in conjunction with the system 100 described in FIGS. 1A, 1B, 2A, 2B, 3A, 3B, and 4.

The method 300 begins at block 305, in which a camera associated with a tablet computer is activated.

After block 305, in block 310, a user is instructed to place an instrument in a target area adjacent to the tablet computer.

After block 310, in block 315, one or more images are received of an instrument when the instrument is placed in the target area, wherein the one or more images are projected from a mirror device to the camera.

After block 315, in block 320, the one or more images are output on a display screen associated with the tablet computer.

Block 320 is followed by block 325, in which the one or more images are processed to determine the instrument resembles a check.

Block 325 is followed by block 330, in which information is identified from the instrument, the information comprising an encoded account number and bank routing number.

Block 330 is followed by block 335, in which some or all of the identified information is output on the display screen of the tablet computer.

Block 335 is followed by block 340, in which some or all of the identified information and at least one of the one or more images are encoded for transmission to a remote location.

Example Use of an Embodiment of the Disclosure

Turning now to an example use case or method 400 shown in FIG. 7 for an embodiment of the disclosure, one will recognize that the system 100 described in FIGS. 1A, 1B, 2A, 2B, 3A, and 3B, and 4, as well as the method 300 described in FIG. 6 can be utilized in conjunction with the example use case or method 400. The use case or method 400 in FIG. 7 can be implemented, for example, by a computer, such as a tablet computer, or the computer described in FIG. 5

A user operating a tablet computer, such as tablet computer 3, can, upon an initial use or a later time, execute 405 a continuous scanner application program or app to enter or input 410 setup information for storage by the application program or app. For instance, the user can enter the name and address of a bank deposit account holder, the account number, and a bank routing number. In some embodiments, additional information can be input as instructed by a bank or other financial institution. In some embodiments, additional preliminary information can be input, such as a language for text and audio prompts.

After the setup information is input and stored by the application program or app, the user can continue executing the application program or app, and mount 415 the tablet computer in a holder, such as the holder 2. In some embodiments, the user may turn on one or more audio functions associated with the tablet computer, either through the application program or app, or by way of a settings menu of the tablet computer.

Next, the user can mount 420 the mirror device 1 on an upper edge of the tablet computer 3, such as an upper edge of a display screen associated with the tablet computer 3. The mirror device 1 can direct, reflect, or otherwise project an image received by the mirror device 1 towards a camera associated with the tablet computer. In this instance, the mirror device 1 can reflect an image of an object, such as an instrument, placed in front of and adjacent to the tablet computer 3 when mounted within the holder 2.

The application program or app can activate 425 a camera associated with the tablet computer, and, in certain instances, set the camera in video mode, wherein the camera receives one or more images, and transmits images to the application program or app, for example, at a rate of 20 or more times per second (depending on the capability of the tablet computer and/or camera).

The application program or app can output 430 to the display screen of the tablet computer, a set of information and/or instructions. For example, a message to the user can be output confirming that the application program or app is working properly. If the user has selected audio prompts, the application program or app can output via a speaker associated with the tablet computer that the application program or app is ready.

Next, the application program or app can output 435 on the display screen of the tablet computer one or more images from the camera. In this instance, the one or more images are projected by the mirror device, which can reflect, project, or transmit views of an object, such as an instrument placed in front of and adjacent the tablet computer. The application program or app can output to the display screen an image with an area relatively larger than the reflected, projected, or transmitted view of the actual object or instrument. The display screen can include a graphical user interface which outputs the image within, framed by, or otherwise annotated by one or more dashed lines.

The application program or app can instruct 440 the user, either with text on the display screen and/or verbally, if audio is selected, for the user to place the object or instrument in a target area specified by the dashed lines. The application program or app can report a status via the display screen that the program or app is waiting for placement or positioning of the object or instrument. Because the camera is transmitting multiple images of the target area to the application program or app at, for example, a rate of 20 times or more per second, the application program or app can indicate to the user the status of the placement and/or positioning of object or instrument in the target area.

The application program or app can process 445 the images of the target area and can determine when an object that resembles a predefined instrument, such as a check, is suitably in the target area.

When the application program or app determines 450 that the object resembles a check and is suitably in the target area, the application program or app can change a border color of the graphical user interface on the display screen to indicate a check has been detected and is suitably in the target area. In some embodiments, the application program or app can further orient the check for processing. For example, the application program or app may perform any number of image rotations, resizing, inverting, and/or rescaling of one or more images of the check prior to storing and/or processing the images of the check. One will recognize that any number of text, OCR, and/or image recognition algorithms, methodologies, and/or techniques can be implemented to suitably identify and/or determine when a scanned object or predefined instrument resembles a check and is suitably in a predefined target area.

After determining the object resembles a check, the application program or app can analyze 455 one or more images of the object or predefined instrument for several pieces of information from the object or predefined instrument, including the encoded account number and routing number at the bottom of a check. If that is not found, the application program or app can report that fact and request the user to indicate whether a selected image of the object or predefined instrument can be transmitted to a bank for the bank to attempt to process a check, such as to deposit the check.

If the application program or app can detect the account and routing numbers, the application program or app can attempt to determine 460 a monetary or currency amount associated with the object or predefined instrument. For example, the application program or app can attempt to recognize a monetary or currency amount associated with a check. If a monetary or currency amount is recognized, the application program or app can display a monetary or currency amount on the display screen of the tablet computer. If the application program or app is unable to recognize a monetary or currency amount, the application program or app can request the user to enter or input the monetary or currency amount on a graphical user interface associated with the display screen of the tablet computer, or in other instances, via an associated keyboard, keypad, virtual keypad or keyboard, gesture and/or voice input device.

In any instance, after a monetary or currency amount is output 465 to the display screen and confirmed by the user, the monetary or currency amount of the object or predefined instrument can be output to the display screen, and the user can be prompted by the application program or app to continue or finish.

As needed, the user can continue using the application program or app to process additional objects or predefined instruments by removing 470 the existing object or predefined instrument from the target area, and placing a new object or predefined instrument in the target area. The application program or app can detect the movement of the existing object or predefined instrument from the target area, and can repeat 475 any number of prior acts or operations, such as 430-470 above, to process additional objects or predefined instruments as long as the user places new objects or predefined instruments in the target area.

In any instance, the user can communicate with the application program or app in one or more of the following ways: (i) using a graphical interface, such as a touch screen, associated with the display screen, (ii) using a keyboard, if connected, associated with the computer or tablet computer, (iii) verbally, if the audio functions are enabled for the computer or tablet computer, and/or (iv) with hand gestures in the target area, and/or (v) with a keypad virtually projected on the table (user sees keypad on display screen but can select a key by tapping on a surface, such as a table, which the application program or app can interpret as tapping a corresponding key of the keypad on the display screen.

When the user indicates to the application program or app, either through an end command or other instruction, that the user is finished entering objects or predefined instruments for processing, the application program or app can encode 480 the received information associated with the scanned objects or predefined instruments, and the one or more images of the scanned objects or predefined instruments, and transmit 485 the encoded information associated with the scanned objects or predefined instruments, and the one or more images of the scanned objects or predefined instruments to a remotely located client device, such as a processing center, bank, or financial institution. One will recognize that any number of encryption algorithms, methodologies, and/or techniques can be implemented to suitably encode the information associated with the scanned objects or predefined instruments, and the one or more images of the scanned objects or predefined instruments, for transmission by the application program or app to a remotely located client device, such as a processing center, bank, or financial institution.

The methods described above with respect to the figures can include fewer or greater numbers of acts or operations within embodiments of the disclosure. One will recognize that certain acts or operations of the methods described above can be implemented with various components of the system embodiments described herein.

The architecture, computer, and methodology described above are provided by way of example only. Numerous other operating environments, system architectures, computers, device configurations, process and method flows are possible. Other architecture and system embodiments can include fewer or greater numbers of components and may incorporate some or all of the functionality described with respect to the architecture or system components shown. Accordingly, embodiments of the disclosure should not be construed as being limited to any particular operating environment, system architecture, or device configuration.

The disclosure described above can be with reference to block and flow diagrams of systems, methods, apparatuses, and/or computer program products according to example embodiments of the disclosure. It will be understood that one or more blocks of the block diagrams and flow diagrams, and combinations of blocks in the block diagrams and the flow diagrams, respectively, can be implemented by computer-readable program instructions. Likewise, some blocks of the block diagrams and flow diagrams may not necessarily need to be performed in the order presented, or may not necessarily need to be performed at all, according to some embodiments of the disclosure.

Various block and/or flow diagrams of systems, methods, apparatus, and/or computer program products can be described with respect to the above example embodiments of the disclosure. It will be understood that one or more blocks of the block diagrams and flow diagrams, and combinations of blocks in the block diagrams and flow diagrams, respectively, can be implemented by computer-readable program instructions. Likewise, some blocks of the block diagrams and flow diagrams may not necessarily need to be performed in the order presented, or may not necessarily need to be performed at all, according to some embodiments of the disclosure.

In certain embodiments, computer-readable communication media can include computer-readable instructions, program modules, or other data transmitted within a data signal, such as a carrier wave, or other transmission. As used herein, however, computer-readable storage media do not include computer-readable communication media. Certain computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosure may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The claimed disclosure is:

1. A system comprising:
 a mirror device configured to mount with respect to an upper portion of a display screen of a tablet computer, when the tablet computer is in a substantially vertical position with respect to a substantially horizontal base surface, wherein the mirror device is further configured to project image information to a camera associated with the tablet computer; and
 a holder configured to position the tablet computer in the substantially vertical position with respect to the substantially horizontal base surface, and maintain the tablet computer and mounted mirror device in respective elevated positions above the substantially horizontal base surface, wherein a lower portion of the holder remains in contact with an upper portion of the substantially horizontal base surface while a portion of the holder is configured to permit sound to be transmitted to an associated speaker and microphone of the tablet computer when the tablet computer is mounted to the holder, and
 wherein the mirror device and the holder have no structural connection between each other, before mounting and after mounting, and wherein the mirror device is positioned to face towards the substantially horizontal base surface and project the image information associated with an instrument, positioned adjacent to the holder and in contact with the upper portion of the substantially horizontal base surface, towards the camera.

2. The system of claim 1, wherein the mirror device comprises a housing configured to mount to an edge of the upper portion of the display screen.

3. The system of claim 1, wherein the holder comprises a cavity configured to insert a portion of the tablet computer.

4. The system of claim 1, wherein the holder comprises one or more perforations configured to permit sound to pass through a wall of the holder to the associated speaker and microphone of the tablet computer.

5. The system of claim 1, further comprising a non-transitory computer-readable medium storing an application program which when executing on the tablet computer when the tablet computer is mounted to the holder, performs the application program comprising computer-executable instructions configured to:
 identify information from the instrument positioned adjacent to the tablet computer;
 output the identified information on the display screen of the tablet computer; and
 encode some or all of the identified information for transmission to a remote location.

6. The system of claim 5, wherein the computer-executable instructions are further configured to:
 detect placement of the instrument positioned adjacent to the tablet computer;
 output an image of the instrument on the display screen of the tablet computer; and
 direct orientation of the instrument with respect to the tablet computer.

7. The system of claim 5, wherein the identified information comprises an account number and a bank routing number.

* * * * *